(12) United States Patent
Hubble

(10) Patent No.: US 9,500,539 B2
(45) Date of Patent: Nov. 22, 2016

(54) DIRECTIONAL SLUG CALORIMETER FOR HEAT FLUX MEASUREMENTS

(71) Applicant: David O. Hubble, King George, VA (US)

(72) Inventor: David O. Hubble, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 423 days.

(21) Appl. No.: 14/293,078

(22) Filed: Jun. 2, 2014

(65) Prior Publication Data

US 2015/0346042 A1 Dec. 3, 2015

(51) Int. Cl.
*G01K 17/00* (2006.01)
(52) U.S. Cl.
CPC ..................... *G01K 17/00* (2013.01)
(58) Field of Classification Search
CPC ....................................... G01K 17/00
USPC ........................................... 374/32
See application file for complete search history.

(56) References Cited

U.S. PATENT DOCUMENTS

| | | | | |
|---|---|---|---|---|
| 3,604,261 A | * | 9/1971 | Olin ........................... | G01P 5/10 73/170.12 |
| 4,384,791 A | * | 5/1983 | Thompson ............. | G01K 17/00 374/32 |
| 5,314,247 A | | 5/1994 | Liebert et al. ................... | 374/29 |
| 6,485,174 B1 | | 11/2002 | Albrecht et al. ................. | 374/29 |
| 6,917,296 B2 | | 7/2005 | Mayusumi et al. .......... | 340/584 |
| 6,971,792 B2 | | 12/2005 | de Ris et al. .................... | 374/29 |
| 7,232,255 B2 | | 6/2007 | Lozinski ......................... | 374/29 |
| 7,318,671 B1 | | 1/2008 | Moghaddam et al. ........... | 374/9 |
| 8,016,480 B2 | | 9/2011 | Lozinski et al. ................ | 374/29 |
| 8,132,962 B1 | | 3/2012 | Feller .............................. | 374/29 |
| 8,568,021 B2 | | 10/2013 | Hassan et al. ................... | 374/29 |
| 2002/0097775 A1 | | 7/2002 | Hamouda et al. .............. | 374/29 |

OTHER PUBLICATIONS

Nawaz, A., & Santos, J. (2010). Assessing Calorimeter Evaluation Methods in Convective Heat Flux Environments. 10th AIAA/ASME Joint Thermophysics and Heat Transfer Conference. doi:10.2514/6.2010-4905.*

Santos, J., Nawaz, A., Martinez, E., & Terrazas-Salinas, I. (2010). Volumetric Heat Flux Characterization Experiments in the Interaction Heating Facility at NASA Ames. 10th AIAA/ASME Joint Thermophysics and Heat Transfer Conference. doi:10.2514/6.2010-4785.*

* cited by examiner

*Primary Examiner* — Minh Phan
*Assistant Examiner* — Leon W. Rhodes, Jr.
(74) *Attorney, Agent, or Firm* — Gerhard W. Thielman, Esq

(57) ABSTRACT

A directional slug calorimeter is provided to enable accurate non-isotropic heat flux measurement in a high-temperature environment. The slug calorimeter includes a tubular member; a plurality of slots formed along a portion of an axial length of the tubular member, insulation disposed within the tubular member and within the plurality of slots; and thermocouples disposed with a thermocouple junction. The plurality of slots divide the tubular member into discrete segments. The thermocouples are disposed in a central region of each of the discrete segments.

18 Claims, 3 Drawing Sheets

DIRECTIONAL SLUG CALORIMETER FOR HEAT FLUX MEASUREMENTS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to slug calorimetry. In particular, the invention relates to directional slug calorimeters that are useful for heat flux measurements in extreme environments.

In order to adequately characterize a thermal environment, both temperature and heat flux must be measured. Temperature is a thermodynamic property of a material and can be easily measured by standard methods. Heat flux, on the other hand, is an energy flow rate per unit area and is therefore far more difficult to obtain. There are two methods commonly utilized for heat flux measurement. The first method measures the temperature drop across a known thermal resistance. This temperature drop can then be related to heat flux by using Fourier's law of heat conduction. Sensors of this type are called differential heat flux sensors.

The second type of heat flux sensor examines the time-rate of change of the temperature of a material that is exposed to a heat flux and isolated from all other thermal influences. When heat flows into an object, its temperature increases. The rate of temperature rise is proportional to the applied heat flux and inversely proportional to the thermal mass of the object. By measuring this rate of temperature rise and calculating the thermal mass of the material, the heat flux into the device can be determined. These devices are typically referred to as slug calorimeters heat flux sensors.

While both types of sensors have been developed and are commercially available, current commercially available sensors typically cannot survive in the extreme environments found in fire research. The high temperatures and high heat fluxes destroy these gages in a short time, rendering them useless in many situations. Even sensors made entirely from high temperature materials typically fail due to stresses that develop due to mismatches in thermal expansion coefficients. These sensors frequently tear apart when heated. As can be seen, there is a need for a device that is capable of surviving extreme environments while obtaining accurate heat flux data.

SUMMARY

Conventional calorimeters yield disadvantages addressed by various exemplary embodiments of the present invention. In particular, a directional slug calorimeter is provided for measuring temperature in high temperature environments. Various exemplary embodiments provide the calorimeter as including a tubular member; a plurality of slots formed along a portion of an axial length of the tubular member, the slots dividing the tubular member into discrete segments; insulation disposed within the tubular member and within the plurality of slots; and thermocouples disposed with a thermocouple junction disposed in a central region of each of the discrete segments.

In other exemplary embodiments, the directional slug calorimeter further includes end caps covering each end of the tubular member; and a support tube extending from at least one of the end caps. In yet other exemplary embodiments, a method for measuring directional heat flux includes disposing the directional slug calorimeter to thermal exposure; calculating a time-rate of change of a temperature history of each of the discrete segments from each of the thermocouples; and multiplying the time-rate of change by a mass and specific heat of the discrete segment and dividing an exposed surface of the segment to give the heat flux of that discrete segment.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The present disclosure relates generally to a directional slug calorimeter that provides accurate non-isotropic heat flux measurement in an environment unsuitable for conventional sensors, such as high temperature refractory chambers. The directionality enables thermal conditions to be geometrically mapped for the test configuration. The slug calorimeter is designed so as to be easily manufactured, affordable and straight-forward to repair, reducing overall lifecycle cost.

The slug calorimeter is formed from a tube having slots machined along an axial direction of the tube. In each of the locations between the slots, a thermocouple can measure the temperature of that location. The time response of the calorimeter can be determined based on its size, with larger tubes forming a slug calorimeter having a slower response time for longer duration heat flux measurements. These and other features, aspects and advantages of the exemplary embodiments will become better understood with reference to the following drawings, description and claims.

With the appropriate materials, the exemplary slug calorimeter has the ability to survive in the environment present within large scale fires while providing multiple, directional measurements. This slug calorimeter is inexpensive to manufacture and can be readily repaired if the thermocouple becomes damaged or the insulation requires replacement.

Because the bulk of the slug calorimeter is fabricated from thick metal, the housing is virtually indestructible under anticipated conditions.

Figure 1:
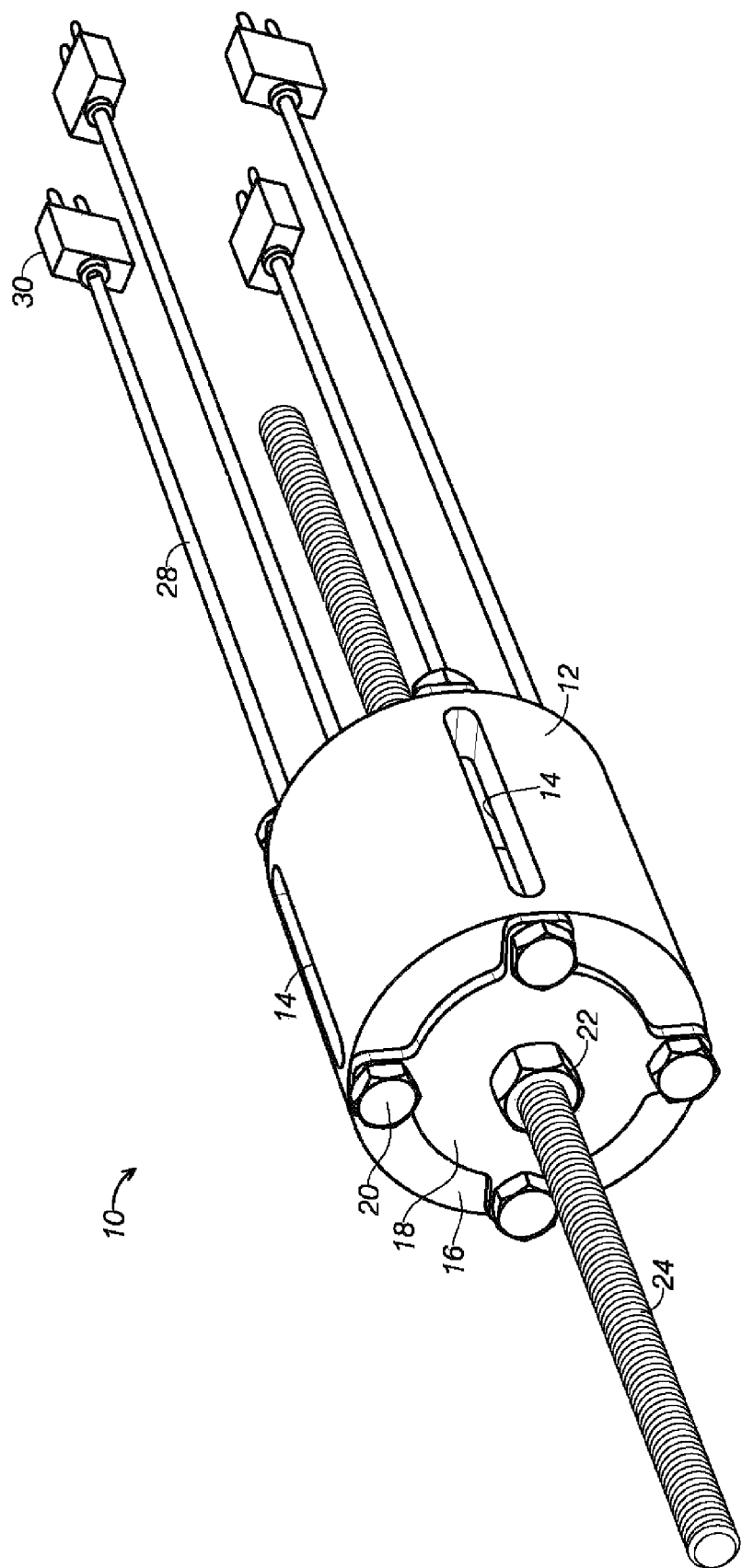
FIG. 1 is a perspective view of an exemplary directional slug calorimeter for heat flux measurements.
Figure 2:
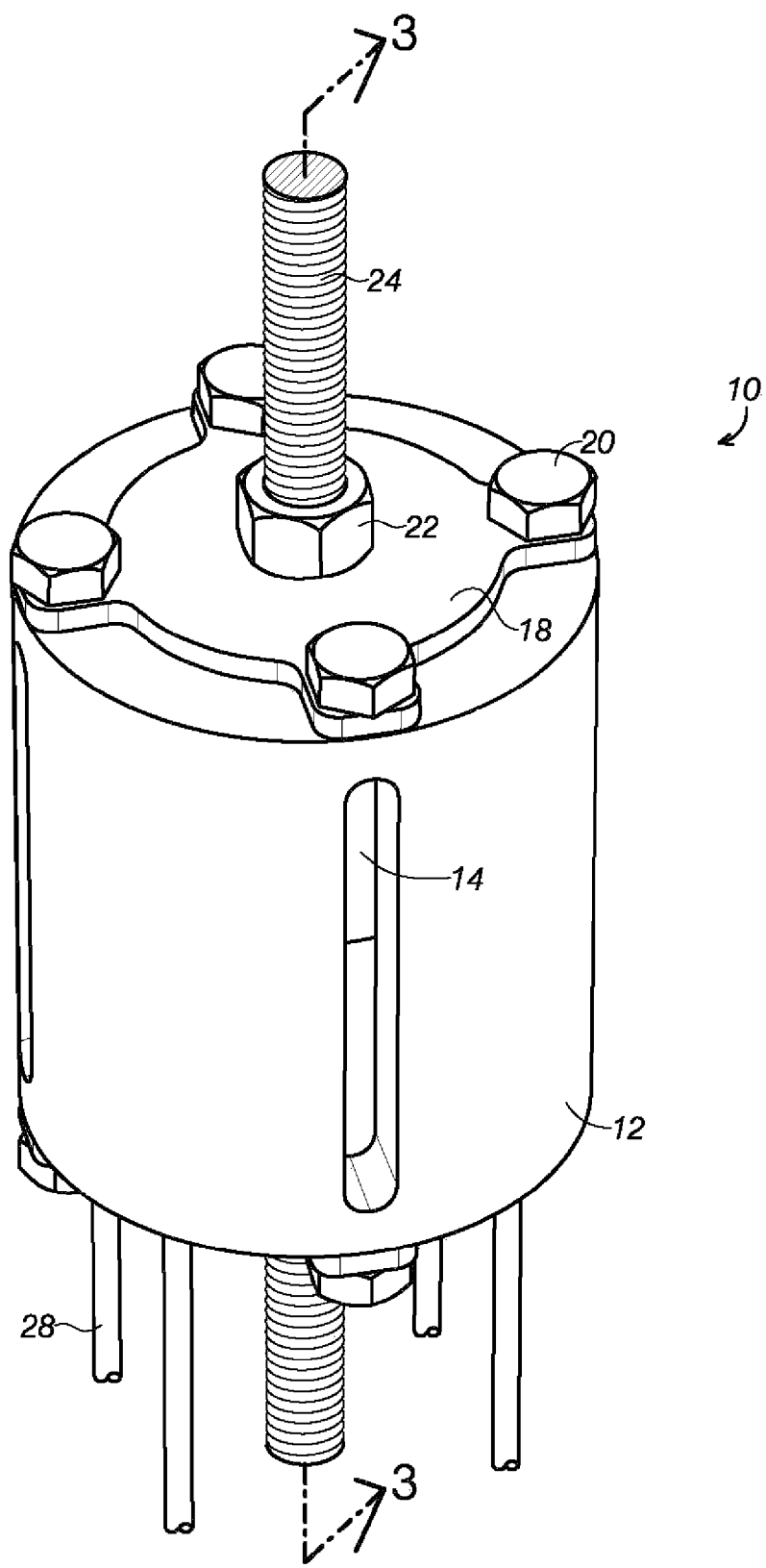
FIG. 2 is a detail perspective view of the directional slug calorimeter of FIG. 1.
Figure 3:
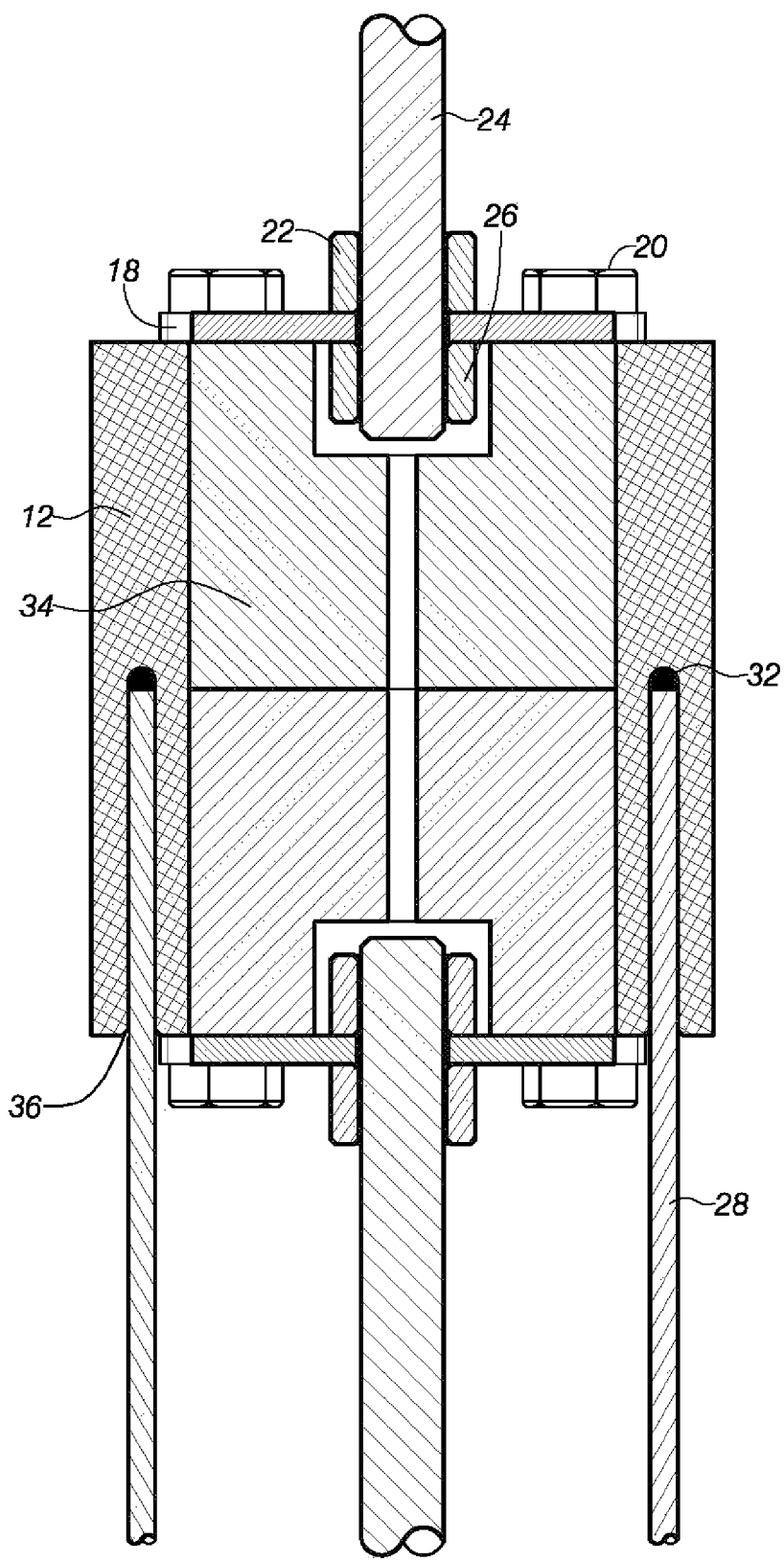
FIG. 3 is a cross-sectional elevation view along line 3-3 of FIG. 2.

Referring to FIGS. 1, 2 and 3, a directional slug calorimeter 10 includes a tubular member or tube 12 having a number of slots 14 formed along an axial direction into the tube 12. Typically, the slots 14 are equally spaced about the tube 12 to separate the tube into distinct regions of equal size. The slots 14 to not extend for the entire length of the tube 12 to prevent the distinct regions from separating. The slots 14 can extend for a length from about 80% to about 95%, preferably about 90%, of the length of the tube 12. Preferably, from two to eight or more slots 14 can be formed in the tube 12.

Refined spatial resolution can be obtained by machining additional slots 14 and dividing the slug calorimeter 10 into more sections. For example, four slots 14, as shown in the drawings, can be formed in the tube 12 to define four distinct regions. The slots 14 serve to thermally isolate each of the distinct regions from its neighbor and allow for multiple independent measurements.

The tube 12 can be made from various materials provided that the material survives the conditions of intended use of the slug calorimeter 10. Typically, the tube 12 is made from a high temperature metal alloy, such as 304 stainless steel, nickel, Inconel, or the like. The tube 12 can be a thick walled tube, typically from about ¼ inch to about 1 inch thick. Of course, the thickness and length of the tube 12 can vary, depending on application. For example, the overall size (length and/or thickness) of the tube 12 can be adjusted to provide the desired thermal response time.

For short duration tests, the slug calorimeter 10 can be made small so as to have a rapid response. A larger (i.e., more massive) tube can provide data for a longer duration at the cost of a slower time response and the inability to resolve quickly changing transients. The ends 16 of the tube 12 can be covered with end caps 18. The end caps 20 can be attached to the tube 12 in various manners. For example, bolts 20 can be used to secure the end caps 18 to ends 16 of the tube 12.

A support tube 24 can extend from one or both of the end caps 18. The support tube 24 can be attached to the end caps in various manners. For example, an exterior nut 22 and an interior nut 26 can be attached, by welding for example, to each side of the end caps 18 and the support tube 24 can be threaded into the exterior nut 22 and the interior nut 26. In an exemplary configuration, the tube has a length of 3.0 inches (7.62 cm) with an outside diameter of 2.7 inches (6.86 cm), with a mass of each quadrant being 0.258 kg when composed of 304 stainless steel.

As shown in FIG. 3, the support tube 24 does not typically extend entirely through the tube 12. However, in some embodiments, the support tube 24 can extend through the tube 12 and out both ends thereof. Insulation 34, such as a rigid, high porosity, high temperature insulation, can be machined to fill the internal volume within the tube 12 and additional insulation 34 can be fitted into the slots 14.

A thermocouple 28 can have a connector 30 on one end thereof and a thermocouple junction 32 on an opposite end thereof. The thermocouple 28 can fit into a hole 36 that is bored into one end of the tube 12 so that the bottom of the hole 36 is centrally positioned between two adjacent slots 14 and between the ends 16 of the tube 12.

The thermocouple 28 can be, for example, a standard mineral insulated metal sheathed (MIMS) thermocouple used to measure the temperature of each quadrant. To ensure that the thermocouple 28 accurately measures the temperature of its insertion segment, the thermocouple 28 should be in intimate thermal contact with the inside of the hole 36. This can be accomplished, for example, by cementing the thermocouple 28 into the hole 36 using a high thermal conductivity, high temperature adhesive. One suitable adhesive utilizing aluminum nitride as its base is Aremco's Ceramabond 865.

To obtain measurements with the directional slug calorimeter 10, the temperature history of each quadrant is monitored during a thermal exposure, such as a fire. The time-rate of change of the temperature history is then calculated using a central difference procedure. Multiplying this time-rate of change by the mass and specific heat of the isolated region and dividing by the exposed surface area gives the heat flux to that region. Increased accuracy can be obtained by determining the specific heat at each time step at the temperature recorded by the thermocouple at that time step, as the specific heat typically varies slightly with temperature.

The exemplary slug calorimeter 10 can be used, for example, by universities and laboratories performing fire research. Additional uses could be found in, for example, boiler and furnace development and maintenance, the petrochemical industry, oil refineries, solar-thermal generation research, etc.

While the drawings show the tube 12 of the slug calorimeter 10 as being a round tube, other tubular cross-sectional shapes may be used within the scope of the present invention. For example, the tube 12 could be a square, hexagonal, or other shaped tube, typically having the slots 14 formed along a corner thereof, thereby dividing the tube into sections at each corner.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A directional slug calorimeter for measuring non-isotropic temperature within an environment, said calorimeter comprising:
   a tubular member;
   a plurality of slots formed along a portion of an axial length of said tubular member, said slots dividing said tubular member into discrete segments;
   insulation disposed within said tubular member and within said slots; and
   a plurality of thermocouples disposed with a thermocouple junction disposed in a central region of each of said discrete segments.

2. The directional slug calorimeter of claim 1, further comprising a pair of end caps that cover corresponding opposite axial ends of the tubular member.

3. The directional slug calorimeter of claim 2, further comprising a support tube extending from at least one of said end caps.

4. The directional slug calorimeter of claim 2, further comprising a support tube extending from each end cap on said opposite axial ends of said tubular member.

5. The directional slug calorimeter of claim 1, wherein said tubular member has a circular cross-section.

6. The directional slug calorimeter of claim 1, wherein said plurality of slots includes four slots.

7. The directional slug calorimeter of claim 1, wherein said thermocouple is disposed in a hole formed in one axial end of the tubular member at each of the discrete segments.

8. The directional slug calorimeter of claim 1, wherein said portion of said axial length of the tubular member is about 90% of said axial length of the tubular member, without extending into either axial end thereof.

9. The directional slug calorimeter of claim 1, wherein said plurality of slots are equally spaced about said tubular member.

10. A directional slug calorimeter for measuring non-isotropic temperature within an environment, said calorimeter comprising:
   a tubular member;
   a plurality of slots formed along a portion of an axial length of said tubular member, said slots dividing said tubular member into equally spaced discrete segments;
   insulation disposed within said tubular member and within said slots;
   thermocouples disposed with a thermocouple junction disposed in a central region of each of said discrete segments;
   a pair of end caps covering each axial end of said tubular member; and
   a support tube extending from at least one of said pair of end caps.

11. The directional slug calorimeter of claim 10, wherein said tubular member has a circular cross-section.

12. The directional slug calorimeter of claim 10, wherein said plurality of slots includes four slots.

13. The directional slug calorimeter of claim 10, wherein said thermocouple is disposed in a hole formed in one end of said tubular member at each of said discrete segments.

14. The directional slug calorimeter of claim 10, wherein said portion of said axial length of said tubular member is about 90% of said axial length of said tubular member, without extending into either end thereof.

15. A method for measuring directional heat flux, comprising:
   disposing a directional slug calorimeter to thermal exposure, the directional slug calorimeter having a tubular member, a plurality of slots formed along a portion of an axial length of said tubular member, said slots dividing said tubular member into discrete segments, insulation disposed within said tubular member and within said slots, and thermocouples disposed with a thermocouple junction disposed in a central region of each of said discrete segments;
   calculating a time-rate of change of a temperature history of each of said discrete segments from a temperature measurement from each of said thermocouples; and
   multiplying a time-rate of change by a mass and a specific heat of said discrete segment and dividing an exposed surface of said segment to calculate a heat flux of said discrete segment.

16. The method of claim 15, further including determining said specific heat of said discrete segment at each time step of a temperature history as a temperature measurement is recorded by said thermocouple at said time step.

17. The method of claim 15, further comprising covering each end of said tubular member with an end cap.

18. The directional slug calorimeter of claim 17, further comprising supporting said tubular member with a support tube extending from at least one of said end caps.

* * * * *